United States Patent
Brown et al.

(10) Patent No.: US 8,507,021 B2
(45) Date of Patent: Aug. 13, 2013

(54) REDUCED FAT CHOCOLATE

(75) Inventors: Anthony Brown, Reading (GB); Heike Grewenig, Ledbury (GB); Andrew Wales, Leamington (GB); Ian Matheson, Studley (GB)

(73) Assignee: Cadbury Holdings Limited (GB)

( * ) Notice: Subject to any disclaimer, the term of this patent is extended or adjusted under 35 U.S.C. 154(b) by 567 days.

(21) Appl. No.: 12/664,771

(22) PCT Filed: Jun. 23, 2008

(86) PCT No.: PCT/GB2008/002157
§ 371 (c)(1),
(2), (4) Date: Jun. 29, 2010

(87) PCT Pub. No.: WO2009/001068
PCT Pub. Date: Dec. 31, 2008

(65) Prior Publication Data
US 2010/0260919 A1    Oct. 14, 2010

(30) Foreign Application Priority Data

Jun. 22, 2007 (GB) .................................. 0712095.9
Jun. 22, 2007 (GB) .................................. 0712096.7

(51) Int. Cl.
A23G 1/00 (2006.01)

(52) U.S. Cl.
USPC .......................................... 426/548; 426/631

(58) Field of Classification Search
USPC ................................. 426/548, 631
See application file for complete search history.

(56) References Cited

U.S. PATENT DOCUMENTS

| | | | |
|---|---|---|---|
| 4,810,516 A * | 3/1989 | Kong-Chan ................ | 426/548 |
| 5,360,621 A | 11/1994 | Mentink | |
| 5,425,957 A * | 6/1995 | Gaim-Marsoner et al. ..... | 426/98 |
| 6,045,850 A * | 4/2000 | Kondou ...................... | 426/548 |
| 6,143,345 A * | 11/2000 | Gonze et al. ................. | 426/548 |
| 7,186,435 B2 * | 3/2007 | Beckett et al. ............... | 426/631 |
| 7,579,031 B2 * | 8/2009 | Simburger .................... | 426/241 |
| 7,579,033 B2 * | 8/2009 | Merrill et al. ................ | 426/582 |
| 7,651,721 B2 * | 1/2010 | Beckett et al. ............... | 426/631 |
| 2001/0007690 A1 | 7/2001 | Girsh | |
| 2004/0086615 A1 | 5/2004 | Johnson | |
| 2007/0082104 A1 | 4/2007 | De Baets | |
| 2008/0075805 A1 | 3/2008 | Dorr et al. | |

FOREIGN PATENT DOCUMENTS

| | | |
|---|---|---|
| EP | 0 489 515 B1 | 6/1992 |
| EP | 0 512 910 B1 | 11/1992 |
| EP | 0 727 146 B1 | 8/1996 |
| JP | 10099022 A | 4/1998 |
| WO | WO9510946 A1 | 4/1995 |
| WO | 96/22696 A | 8/1996 |
| WO | 2009/001063 A1 | 12/2008 |

OTHER PUBLICATIONS

Minifie, B. 1980. Chocolate, Cocoa and Confectionery:Science and Technology, 2nd edition. AVI Publishing Company, Inc. Westport, CT. p. 37, 39, 42, 52 & 65.*
Netzer, C. 1991. The Complete Book of Food Counts. A Dell Book. New York. p. 96, 97, 172, 173.*
Goossens, J., et al, "Nutritional and application properties of erythritol: a unique combination? II. Application properties", Agro Food Industry Hi-Tech, Teknoszienze, Milan, IT, vol. 8, No. 5, Jan. 1, 1997, pp. 12-16.
Hartel, R. W., et al, "Polyols and bulking agents in sugarfree chocolate", Manufacturing Confectioner, vol. 81, No. 6, Jan. 1, 2001, pp. 81-92.
International Search Report for PCT/GB2008/002151, mailed Oct. 6, 2008, 3 pages.
International Search Report of PCT/GB2008/002157, mailed Oct. 6, 2008, 3 pages.

* cited by examiner

*Primary Examiner* — Carolyn Paden
(74) *Attorney, Agent, or Firm* — Cantor Colburn LLP

(57) ABSTRACT

The present invention provides a reduced fat chocolate composition comprising erythritol. In one embodiment the chocolate composition is characterized in that it has a total fat content of from 15 wt % to 24.9 wt %. In another embodiment the chocolate composition comprising erythritol is characterized in that it has a total fat content of from 15 wt % to 26 wt % and does not comprise inulin or fructo oligosaccharide (FOS). A process for the preparation of the chocolate composition is provided, said process having processing parameters similar to those for high fat chocolate.

15 Claims, No Drawings

REDUCED FAT CHOCOLATE

BACKGROUND OF THE INVENTION

The invention relates to a reduced fat chocolate and to a process for the manufacture of a reduced fat chocolate.

Chocolate is a high fat and high calorie food. A typical commercial dark chocolate will normally comprise non-fat cocoa solids, fat, sugar and emulsifier. A typical commercial milk chocolate will normally comprise non-fat cocoa solids, fat, milk solids, sugar and emulsifier. A typical commercial white chocolate will normally comprise milk solids, fat, sugar and emulsifier. The fat will usually consist of cocoa butter but since cocoa butter is expensive, it is often at least partially replaced with alternative fats such as butterfat or cocoa butter equivalent (CBE). Chocolate may contain many other ingredients; flavours such as vanilla are popular as well as inclusions such as nuts, dried fruit, toffee and biscuit pieces.

A typical commercial dark chocolate has a total fat content in the range of 26 wt % to 50 wt %, a typical commercial milk chocolate has a total fat content in the range of 27 wt % to 45 wt % and a typical commercial white chocolate has a total fat content in the range of 31 wt % to 45 wt %. The calorie content of chocolate is usually around 530 kcal/100 g, of which fat generally provides more than 50%.

Internationally accepted guidelines propose that fat should provide no more than 30 to 35% of an individual's daily calorie intake. In addition, chocolate is high in saturated fats. A high concentration of saturated fats is considered undesirable in view of established adverse health effects associated with such fats.

In good quality chocolate, there is a continuous fat phase which coats all the solid particles and fills the void between them. In theory, reduction in the fat content of chocolate can be simply achieved by reducing the amount of fat ingredients (such as cocoa butter or milk fat) or of fat-containing ingredients (such as cocoa liquor, milk powder or hazelnut) to be mixed with other chocolate-making ingredients to form the chocolate composition. However, there are technical restraints on fat reduction in chocolate. As the fat content is reduced, the overall processing of the chocolate becomes significantly more difficult.

Accordingly it would be desirable to provide a chocolate composition having a reduced fat content whilst maintaining processing parameters similar to those of high fat compositions.

It is generally known to replace sucrose in chocolate with substitutes such as sugar alcohols (also known as polyols). This reduces the calorie content provided by sucrose and therefore the calorie content of the chocolate composition but it does not reduce the fat content of the composition. In some cases the use of polyols in place of sucrose may result in a higher fat content being required in order to give similar processing properties. Sugar alcohols are less sweet than sucrose but generally provide fewer calories because they are incompletely digestible. As with many other incompletely digestible substances, overconsumption can lead to gastrointestinal effects such as bloating, diarrhoea and flatulence. Erythritol is a sugar alcohol that is better tolerated than the other sugar alcohols because it is excreted via the kidneys. It is almost as sweet as sucrose (70% relative sweetness) and has a calorie content of just 0.2 kcal/g. Erythritol has a high negative heat solution (−180 joules/g) that provides a significant cooling effect in the mouth. This effect combines well with mint flavours, e.g. in chewing gums, but can be less desirable in other types of confectionery such as chocolate.

Erythritol is commonly combined with inulin and fructo oligosaccharide (FOS) which offer a complementary positive heat of solution. FOS and inulin are used as low calorie bulking agents. They are not digested in the human small intestine and thus have a lower caloric value whilst contributing dietary fibre to the diet. Unfortunately inulin and FOS have a propensity to cause bloating and flatulence when consumed in moderate to large quantities.

An oligosaccharide is a saccharide polymer containing a small number (typically three to ten) of component sugars, also known as simple sugars. FOS is based on fructose, galacto oligosaccharide (GOS) is based on galactose and xylo oligosaccharide (XOS) is based on xylose.

SUMMARY OF THE INVENTION

According to a first aspect of the present invention, there is provided a chocolate composition comprising erythritol, characterised in that the chocolate composition has a total fat content of from 15 wt % to 24.9 wt %.

In one embodiment, the chocolate composition of the first aspect does not comprise inulin or fructo oligosaccharide (FOS).

According to a second aspect of the present invention, there is provided a chocolate composition comprising erythritol characterised in that the chocolate composition has a total fat content of from 15 wt % to 26 wt % and does not comprise inulin or fructo oligosaccharide (FOS).

The chocolate composition of the present invention may comprise in one embodiment from 5 to 70 wt % erythritol. In another embodiment the chocolate composition may comprise from 15 to 50 wt % erythritol. In a further embodiment the chocolate composition may comprise from 20 to 45 wt % erythritol.

In certain embodiments the chocolate composition of the invention may have a total fat content of at least 16 wt %, of at least 17.5 wt %, of at least 19 wt % or of at least 20 wt %. In certain embodiments the chocolate composition of the invention may have a total fat content of no more than 24 wt %, no more than 22.5 wt %, or no more than 21.5 wt %.

In certain embodiments, the chocolate composition (of either the first or the second aspect) does not comprise inulin or FOS. In further embodiments, the chocolate composition does not comprise inulin, FOS, GOS or XOS. In yet further embodiments, the chocolate composition does not comprise inulin or any oligosaccharide.

According to a third aspect of the present invention, there is provided a process for preparing a chocolate composition in accordance with the first or second aspect of the invention, comprising the following steps:

mixing (i) erythritol and (ii) at least one fat to form a paste;
adjusting the particle size of the paste to a predetermined value; and
liquefying the paste whereby to effect flavour development.

DETAILED DESCRIPTION OF THE INVENTION

In certain embodiments, the liquefied chocolate composition is subjected to a tempering step.

The term 'chocolate composition' in the context of the present invention is not restricted by the various definitions of chocolate provided by government and regulatory bodies. A chocolate composition is simply a product obtained from cocoa products and sweeteners.

The chocolate composition of the first and second aspects may be a dark chocolate, a milk chocolate or a white chocolate composition. In a particular embodiment, the chocolate composition is a milk chocolate composition.

In an embodiment where the chocolate composition is a milk chocolate composition, the chocolate composition may comprise cocoa liquor, cocoa butter, milk or milk powder and erythritol.

The chocolate composition may be moulded or extruded to form a bar (filled or solid), it may be moulded or deposited to form a solid or a filled chocolate which may be of single mouthful size, or it may take the form of vermicelli chocolate, chocolate flakes or gianduja nut chocolate derived from any of such chocolate types. Alternatively, it may be used as a coating chocolate.

The chocolate composition comprises at least one fat. The fat may be cocoa butter, butterfat, a cocoa butter equivalent (CBE), a cocoa butter replacer (CBR), a vegetable fat that is liquid at standard ambient temperature and pressure (SATP, 25° C. and 100 kPa) or any combination of the above. In a particular embodiment, the chocolate composition comprises cocoa butter.

CBE's are defined in Directive 2000/36/EC as complying with the following criteria:
 a) they are non-lauric vegetable fats, which are rich in symmetrical monounsaturated triglycerides of the type POP, POSt and StOSt;
 b) they are miscible in any proportion with cocoa butter, and are compatible with its physical properties (melting point and crystallisation temperature, melting rate, need for tempering phase);
 c) they are obtained only by the processes of refining and/or fractionation, which excludes enzymatic modification of the triglyceride structure.

Suitable CBE's include illipe, Borneo tallow, tengkawang, palm oil, sal, shea, kokum gurgi and mango kernel. CBE's are usually used in combination with cocoa butter. In one embodiment, the chocolate composition comprises no more than 5 wt % CBE's.

The chocolate composition may comprise a cocoa butter substitute (CBS) (sometimes known as a cocoa butter replacer, CBR) in place of some or all of the cocoa butter. Such chocolate compositions are sometimes known as compound chocolate. Suitable CBS's include CBS laurics and CBS non-laurics. CBS laurics are short-chain fatty acid glycerides. Their physical properties vary but they all have triglyceride configurations that make them compatible with cocoa butter. Suitable CBS's include those based on palm kernel oil and coconut oil. CBS non-laurics consist of fractions obtained from hydrogenated oils. The oils are selectively hydrogenated with the formation of trans acids, which increases the solid phase of the fat. Suitable sources for CBS nonlaurics include soya, cottonseed, peanut, rapeseed and corn (maize) oil.

The chocolate composition may comprise at least one vegetable fat that is liquid at standard ambient temperature and pressure (SATP, 25° C. and 100 kPa). A liquid vegetable fat may be employed when a liquid chocolate composition is desired. Suitable vegetable fats include corn oil, cotton seed oil, rapeseed oil, palm oil, safflower oil, and sunflower oil.

The present invention is further applicable to chocolate compositions in which some or all of the fat is constituted by a partly or wholly non-metabolisable fat, for example Caprenin.

The chocolate composition may comprise at least one further sweetener in addition to erythritol. Such sweeteners include sugars (e.g. sucrose, dextrose, glucose syrup solids, fructose, lactose and maltose and any combination thereof), sugar alcohols (e.g. sorbitol, xylitol, mannitol, lactitol, isomalt and maltitol, or any combination thereof), intense sweeteners (e.g. aspartame, acesulfame-K, cyclamates, saccharin, sucralose, neohesperidin, dihydrochalone, alitame, stena sweeteners, glycyrrhizin, or any combination thereof) and any combination of sugars, sugar alcohols and intense sweeteners. In certain embodiments, said at least one further sweetener comprises maltitol, sucralose, acesulfame K or any combination thereof. In a particular embodiment, said at least one further sweetener does not include sucrose, glucose syrup solids or fructose. Erythritol may be the sole sweetener in the chocolate composition.

The chocolate composition of the present invention may have a reduced calorie content as compared to a standard fat chocolate. A standard fat chocolate has a calorie content of around 530 calories per 100 g in the range. In one series of embodiments, the chocolate composition of the present invention has a reduction in calories of at least 10% as compared to standard fat chocolate, or of at least 20% as compared to a standard fat chocolate or of at least 30% as compared to a standard fat chocolate. The chocolate composition of the present invention may in some embodiments have a calorie content of from 405 to 450 calories per 100 g, or from 355 to 415 calories per 100 g or from 330 to 370 calories per 100 g.

In order to improve the viscosity during processing of the chocolate composition, at least one emulsifier will normally be included as an ingredient. Typically, such emulsifiers include lecithin derived from soya bean, safflower, corn etc., fractionated lecithins enriched with either phosphatidyl choline, phosphatidyl ethanolamine, phosphatidyl inositol; emulsifiers derived from oats, mono- and diglycerides and their tartaric esters, monosodium phosphate derivatives of mono- and diglycerides of edible fats and oils, sorbitan monostearate, polyoxyethylene sorbitan monostearate, hydroxylated lecithin, synthetic phospholipids such as ammonium phosphatides, polyglycerol polyricinoleate (PGPR), lactylated fatty acid esters of glycerol and propylene glycol, polyglycerol esters of fatty acids, citric acid esters of fatty acids, propylene glycol mono- and diesters of fats and fatty acids. In certain embodiments, at least one of soya lecithin and a synthetic phospholipid such as ammonium phosphatides and polyglycerol polyricinoleate (PGPR) is employed as the emulsifier.

Chocolate compositions in accordance with the present invention may further include flavourings, especially those traditionally associated with chocolate, such as vanilla, orange and mint.

The chocolate composition may comprise at least one bulking agent such as microcrystalline cellulose, polyglycitol (polymers of maltitol), polydextrose (a polysaccharide composed of randomly cross-linked glucose, containing minor amounts of sorbitol and acid) and maltodextrin. In a particular embodiment, the chocolate composition comprises polydextrose or maltodextrin or a combination thereof.

The chocolate composition may contain high protein ingredients. In the context of the present invention "high protein ingredients" refers to ingredients that are constituted by at least 40 wt % protein. Suitable high protein ingredients include casein, whey proteins (including whey protein concentrate, whey protein isolate and whey protein hydrolysate), sweet whey, milk protein, pea protein, soy protein, and any combination thereof. In certain embodiments, the chocolate composition comprises whey protein isolate.

In a certain embodiment of the first and second aspects of the present invention, a chocolate composition comprises cocoa liquor, cocoa butter, milk fat, skimmed milk powder (SMP), erythritol, maltitol, polydextrose, maltodextrin, whey protein and emulsifier.

A further embodiment of the first and second aspects of the present invention is shown in table 1 below.

TABLE 1

| Ingredient | Proportion of final product (wt %) |
|---|---|
| Cocoa liquor | 10 to 15 |
| Cocoa butter | 7.5 to 15 |
| Milk fat | 0.5 to 7.5 |
| Skimmed milk powder | 10 to 15 |
| Erythritol | 20 to 35 |
| Maltitol | 5 to 12 |
| Polydextrose | 5 to 12 |
| Maltodextrin | 5 to 12 |
| Whey protein isolate | 5 to 12 |
| Emulsifier | 0 to 3 |

Embodiments of the invention will now be described by way of example only.

Methodology

Chocolate compositions were prepared to the recipes described below using the following general method:

The dry ingredients (i.e. cocoa powder, milk powder, erythritol, whey protein, maltodextrin, polydextrose) are mixed together for 10 minutes in a jacketed Hobart mixer at a temperature of 45 to 50° C.

Fat (i.e. cocoa butter, emulsifiers, milk fat) and cocoa liquor (if required) is then added to the Hobart mixer to produce a consistent paste.

The paste is then roll refined to produce a refiner flake having a reduced particle size. Additional fat may be added at this stage if necessary. In these examples, the particle size was reduced to a d84 of 18-20 μm.

The refiner flake is then conched by mixing at speed 1 in a jacketed Hobart mixer at a temperature of 45 to 50° C. for 3 hours and 15 minutes.

Any remaining ammonium phospatides may then be added and mixing continued for a further 1 hour and 15 minutes.

Any remaining fat including polyglycerol polyricinoleate may then be added and mixing continued for a further 30 minutes.

Finally, the mixture is hand tempered and moulded into bars.

EXAMPLE 1

A reduced fat chocolate composition having a total fat content of 20.5 wt % and a calorie content of 335 kcal/100 g was prepared using a standard full fat chocolate process (described above) and the ingredients listed in table 2 below.

TABLE 2

| Ingredient | Fat content (%) | wt % of final product (wt %) | Mass (g) | Fat content by weight of final product (%) |
|---|---|---|---|---|
| Cocoa liquor | 52.5 | 13.30 | 199.5 | 7.0 |
| Cocoa butter | 100 | 9.00 | 135.0 | 9.0 |
| Milk fat | 100 | 2.50 | 37.5 | 2.5 |
| Skimmed milk powder | 0.1 | 13.8 | 207.0 | 0 |
| Erythritol | 0 | 26.90 | 403.5 | 0 |
| Maltitol | 0 | 9.40 | 141.0 | 0 |
| Polydextrose | 0 | 9.50 | 142.5 | 0 |
| Glucidex ® (maltodextrin) | 0 | 6.80 | 102.0 | 0 |
| Whey protein isolate | 0 | 6.80 | 102.0 | 0 |
| Ammonium phosphatides (emulsifier) | 100 | 1.00 | 15.0 | 1.0 |
| Citric acid ester of fatty acid (emulsifier) | 100 | 0.60 | 9.0 | 0.6 |

TABLE 2-continued

| Ingredient | Fat content (%) | wt % of final product (wt %) | Mass (g) | Fat content by weight of final product (%) |
|---|---|---|---|---|
| PGPR (polyglycerol polyricinoleate, emulsifier) | 100 | 0.40 | 6.0 | 0.4 |
| TOTAL | | 100 | 1500 | 20.5 |

The chocolate was evaluated by 5 testers. It had a good taste, a good melt and was not grainy. Overall the chocolate was found to be a satisfactory reduced fat chocolate.

EXAMPLE 2

A reduced fat chocolate composition having a total fat content of 25 wt % and a calorie content of 369 kcal/100 g was prepared using a standard full fat chocolate process (described above) and the ingredients listed in table 3 below.

TABLE 3

| Ingredient | Fat content (%) | wt % of final product (wt %) | Mass (g) | Fat content by weight of final product (%) |
|---|---|---|---|---|
| Cocoa liquor | 52.5 | 13.30 | 199.5 | 7.0 |
| Cocoa butter | 100 | 13.10 | 196.5 | 13.1 |
| Milk fat | 100 | 3.50 | 52.5 | 3.5 |
| Skimmed milk powder | 0.1 | 14.00 | 210.0 | 0 |
| Erythritol | 0 | 24.80 | 372.0 | 0 |
| Maltitol | 0 | 8.50 | 127.5 | 0 |
| Polydextrose | 0 | 8.80 | 132.0 | 0 |
| Glucidex ® (maltodextrin) | 0 | 6.30 | 94.5 | 0 |
| Whey protein isolate | 0 | 6.30 | 94.5 | 0 |
| Ammonium phosphatides (emulsifier) | 100 | 1.00 | 15.0 | 1.0 |
| PGPR (polyglycerol polyricinoleate, emulsifier) | 100 | 0.40 | 6.0 | 0.4 |
| TOTAL | | 100 | 1500 | 25.0 |

The chocolate was evaluated by 5 testers and was found to be a satisfactory reduced fat chocolate.

EXAMPLE 3

A reduced fat chocolate composition having erythritol as the sole sweetener, a total fat content of 23.7 wt % and a calorie content of 310 kcal/100 g is prepared using a standard full fat chocolate process (described above) and the ingredients listed in table 4 below.

TABLE 4

| Ingredient | Fat content (%) | wt % of final product (wt %) | Fat content by weight of final product (%) |
|---|---|---|---|
| Cocoa liquor | 52.5 | 12.00 | 6.3 |
| Cocoa butter | 100 | 12.60 | 12.60 |
| Butter fat | 100 | 4.50 | 4.50 |
| Skimmed milk powder | 0.1 | 23.00 | 0 |
| Erythritol | 0 | 47.6 | 0 |
| YN100 (emulsifier) | 100 | 0.30 | 0.3 |
| TOTAL | | 100 | 23.7 |

The invention claimed is:

1. A chocolate composition which is a moulded, extruded or deposited chocolate or a coating chocolate, comprising erythritol, at least one further sweetener selected from maltitol, sucralose, acesulfame K and combinations thereof, and fat characterised in that the chocolate composition has a total fat content from 15 wt % to 24.9 wt %.

2. A composition as claimed in claim 1, which does not comprise inulin or fructo oligosaccharide (FOS).

3. A chocolate composition as claimed in claim 1, comprising from 5 to 70 wt % erythritol.

4. A chocolate composition as claimed in claim 1, wherein the total fat content is at least 16 wt %.

5. A chocolate composition as claimed in claim 1, wherein the total fat content is no more than 24 wt %.

6. A chocolate composition as claimed in claim 1, wherein said at least one further sweetener does not include sucrose, glucose syrup solids or fructose.

7. A chocolate composition as claimed in claim 1, having a calorie content of from 405 to 450 calories per 100 g.

8. A chocolate composition as claimed in claim 7, having a calorie content of from 355 to 415 calories per 100 g.

9. A chocolate composition as claimed in claim 8, having a calorie content of from 330 to 370 calories per 100 g.

10. A chocolate composition as claimed in claim 1, additionally comprising at least one bulking agent selected from microcrystalline cellulose, polyglycitol, polydextrose and maltodextrin.

11. A chocolate composition as claimed in claim 1, additionally comprising a high protein ingredient selected from casein, whey proteins, sweet whey, milk protein, pea protein, soy protein, and any combination thereof.

12. A chocolate composition as claimed in claim 1, comprising cocoa liquor, cocoa butter, milk fat, skimmed milk powder, maltitol, polydextrose, maltodextrin, whey protein and emulsifier.

13. A chocolate composition as claimed in claim 12, comprising the ingredients within the following ranges:

| Ingredient | Range |
|---|---|
| Cocoa liquor | 10 to 15 wt % |
| Cocoa butter | 7.5 to 15 wt % |
| Milk fat | 0.5 to 7.5 wt % |
| Skimmed milk powder | 10 to 15 wt % |
| Erythritol | 20 to 35 wt % |
| Maltitol | 5 to 12 wt % |
| Polydextrose | 5 to 12 wt % |
| Maltodextrin | 5 to 12 wt % |
| Whey protein | 5 to 12 wt % |
| Emulsifier | 0.01 to 3 wt %. |

14. A chocolate composition which is a moulded, extruded or deposited chocolate or a coating chocolate, comprising erythritol, at least one further sweetener selected from maltitol, sucralose, acesulfame K and combinations thereof, and fat characterised in that the chocolate composition has a total fat content of from 15 wt % to 26 wt % and does not comprise inulin or fructo oligosaccharide (FOS).

15. A process for preparing a chocolate composition, comprising:

mixing (i) erythritol, (ii) at least one further sweetener selected from maltitol, sucralose, acesulfame K and combinations thereof, and (iii) at least one fat to form a paste;

adjusting the particle size of the paste to a predetermined value; and liquefying the paste to effect flavour development, wherein the chocolate composition has a total fat content from 15 wt % to 24.9 wt %.

* * * * *